(No Model.)

J. A. WILKENS.
TREE TRANSPLANTER.

No. 594,668. Patented Nov. 30, 1897.

Witnesses:
Collie E.
F. W. Woerner

Inventor,
John A. Wilkens
By Joseph A. Minturn
Attorney.

THE NORRIS PETERS CO., PHOTO-LITHO., WASHINGTON, D. C.

UNITED STATES PATENT OFFICE.

JOHN A. WILKENS, OF INDIANAPOLIS, INDIANA.

TREE-TRANSPLANTER.

SPECIFICATION forming part of Letters Patent No. 594,668, dated November 30, 1897.

Application filed December 29, 1896. Serial No. 617,434. (No model.)

*To all whom it may concern:*

Be it known that I, JOHN A. WILKENS, a citizen of the United States, residing at Indianapolis, in the county of Marion and State of Indiana, have invented certain new and useful Improvements in Tree-Transplanters; and I do hereby declare the following to be a full, clear, and exact description of the invention, such as will enable others skilled in the art to which it appertains to make and use the same.

This invention relates to improvements in means for transplating trees, and has for its objects, first, the removal of the roots of the tree, together with the earth in which they have been growing, without disturbing the roots or displacing any of the dirt around them; second, to provide easy means for separating the earth and roots to be removed from the surrounding earth and to provide means for holding the dirt in place during the process of removal and transportation of the tree to its new location; third, to provide means for handling the tree without bruising the bark, and, fourth, to provide means for planting the tree in the exact position with relation to the points of the compass in which it grew originally and of filling in the dirt around the mass containing the roots before the retaining-plates which hold the original dirt to the roots are removed.

I accomplish the objects of this invention by means of the mechanism illustrated in the accompanying drawings, in which—

Figure 1 is a view in perspective of a derrick from which a tree with its roots incased in my improved apparatus is suspended preparatory to being lowered into the underlying hole and planted, or, as the case may be, having just been raised out of the hole where it originally grew. Fig. 2 is a detail in vertical section showing the roots of a tree to be transplanted and showing one of my improved blades driven into the ground and another in place preparatory to being driven. Fig. 3 is a top plan view of my improved transplanting device; Fig. 4, a view in perspective of one of the blades for cutting down around the roots and holding the dirt in place, and Fig. 5 is a view in cross-section on the line 5 5 of Fig. 4.

Similar letters of reference indicate like parts throughout the several views of the drawings.

A represents a tree to be transplanted, and B a platform of any suitable material, as wood or metal. It is circular in form and is divided diametrically into two equal and separable parts, which will be removably secured to each other by any suitable means. The means shown in the drawings consists of a bar or link C, placed on the under side of the platform, with one end under each of the sections of the divided platform and provided at each end with vertical bolts, which are projected through the platform, and the upper ends of the bolts are joined together by means of the hooks *c*. The hooks are pivoted at one of their ends to one of the bolts, and the opposite end, which is slotted, is pushed onto the other bolt, which has a head to keep the bolt from being drawn down through the slot.

An opening is provided at the center of the platform B, and a two-part annular plate D is bolted to the under side of the platform next to the opening. This plate has the inside vertical annular flange E, which is projected through the opening in the platform and projects a considerable distance above the surface of the platform. The part which projects above the platform is provided with a series of holes *e* for the attachment of the cutter-blade rods, as will be more fully described hereinafter. The flange E is lined on the inside with an elastic material or soft material F to keep the flange from bruising the bark of the tree around which the platform will be placed with the tree concentric with the central opening through said platform.

G are the cutter-blades, which are driven into the ground around the outside edge of the platform. These blades are tapering and concave and will preferably be made from sheet-steel of sufficient thickness to give the requisite strength to enable the blades to be driven down into the earth around the platform. The side edges *g* will be beveled and sharpened to facilitate the passage of the blades through any obstructions and to cut off such roots as may be of unusual length. The shape of the blades is such that when the entire series is in place around the platform the whole will approximate a hemisphere in shape. The blades do not meet at the bottom, but instead they leave an opening through which the main or tap root of some species of trees will project without being cut off. To cut the tap-root off would be detrimental to the tree and quite unnecessary, as this extreme end of the root can be readily pulled out after the blades have been driven and the other parts all cut loose. To strengthen the blades, I prefer to bend them so as to form the longitudinal corrugation or rig G'. Each blade will terminate at the top with the cast-iron head $G^2$, upon which the blows of a maul used in driving the blades into the ground will be delivered. H is a rod which is rigidly fastened at one end to the head of the blade and terminates with the hook $h$ at the other end. This hook will be caught into one of the holes or eyes $e$ in the band or flange E as a preparatory step to driving the blade into the ground, as shown in Fig. 2, and this construction, together with the shape of the blade, causes the latter to follow the path indicated by the dotted line. When the blades are all driven, they so completely inclose the roots that no dirt can drop out, and consequently the myriad of delicate rootlets are left intact. In driving the blades down the meeting of an obstruction will be indicated by the extra elevation of the cap on that side and will indicate that the blows from the maul should be delivered on the highest side. When the blades are driven in till the rods rest on the platform, they will be secured by swinging the catches $b$ around over the rod.

To remove the tree after the blades have been driven in, a portable derrick—such, for example, as is shown in the drawings or of any other convenient form—will be erected, and the rope from a block and tackle will be made fast to the eyebolt M in the platform. Then the tree will be drawn out by a team of horses or other suitable power. If the hitch for drawing the tree is made to a single eyebolt, the whole weight of the dirt within the inclosure is virtually resting on the two under blades. To relieve this condition as much as possible, I will drive the two curved iron stakes P down through suitable openings through the platform and into the earth around the roots. These stakes are curved or bent in the manner as shown in Fig. 2 and will help to support the weight, and if provided with eyes the rope from the block and tackle can be in two pieces and made fast to each of the stakes and the pull made from the stakes instead of from the single eyebolt.

The joint between the two parts of the platform will provide an indicating-line, by means of which the tree can be planted with relation to the points of the compass exactly as it originally grew.

S represents a magnetic compass, by means of which the platform can be put down around the tree with the joint-line exactly north and south. Then when the tree is planted if this line is made to point in the same direction by the aid of the compass the tree will be planted with the bark in the direction in which it originally grew.

After the tree has been lowered into the hole, which is dug large to receive it, the dirt can be filled in around and mulched, if desired, before the blades are withdrawn. This insures that the dirt around the roots is not disturbed, and the transplanting will be accomplished without danger to the life of the tree.

Having thus fully described my invention, what I claim as new, and wish to secure by Letters Patent, is—

1. In a transplanter for trees, a platform in two parts removably secured together, said platform having a central opening to receive the tree and means for fastening the blades to the platform, of a plurality of blades shaped and curved substantially as described and adapted to be driven into the ground around the margin of the platform so as to cut off a determinate portion of the earth within which the tree-roots are growing and hold the earth while the tree is being transported, and means substantially as described for hinging the blades to the platform and guiding them into position.

2. The combination, with a two-part platform having a central opening to receive the tree, said parts being removably secured together to permit of the introduction of the tree, a cushion-lining for the opening to prevent injury to the tree and a plurality of pointed and curved blades hinged to the platform whereby when the blades are driven into the ground they will cut off a determinate portion of the earth containing the tree-roots and hold the earth from displacement during the removal of the tree, all substantially as described and specified.

3. The combination, with the platform B and the blades G secured to the platform in the manner described, of the bent stakes P to assist in lifting and sustaining the weight of earth around the roots and which is to be removed with the tree.

In testimony whereof I affix my signature in presence of two witnesses.

JOHN A. WILKENS.

Witnesses:
JOSEPH A. MINTURN,
F. W. WOERNER.